(No Model.)
W. BIRCH.
APPARATUS FOR CLEANSING SEWAGE, &c.
No. 491,796. Patented Feb. 14, 1893.
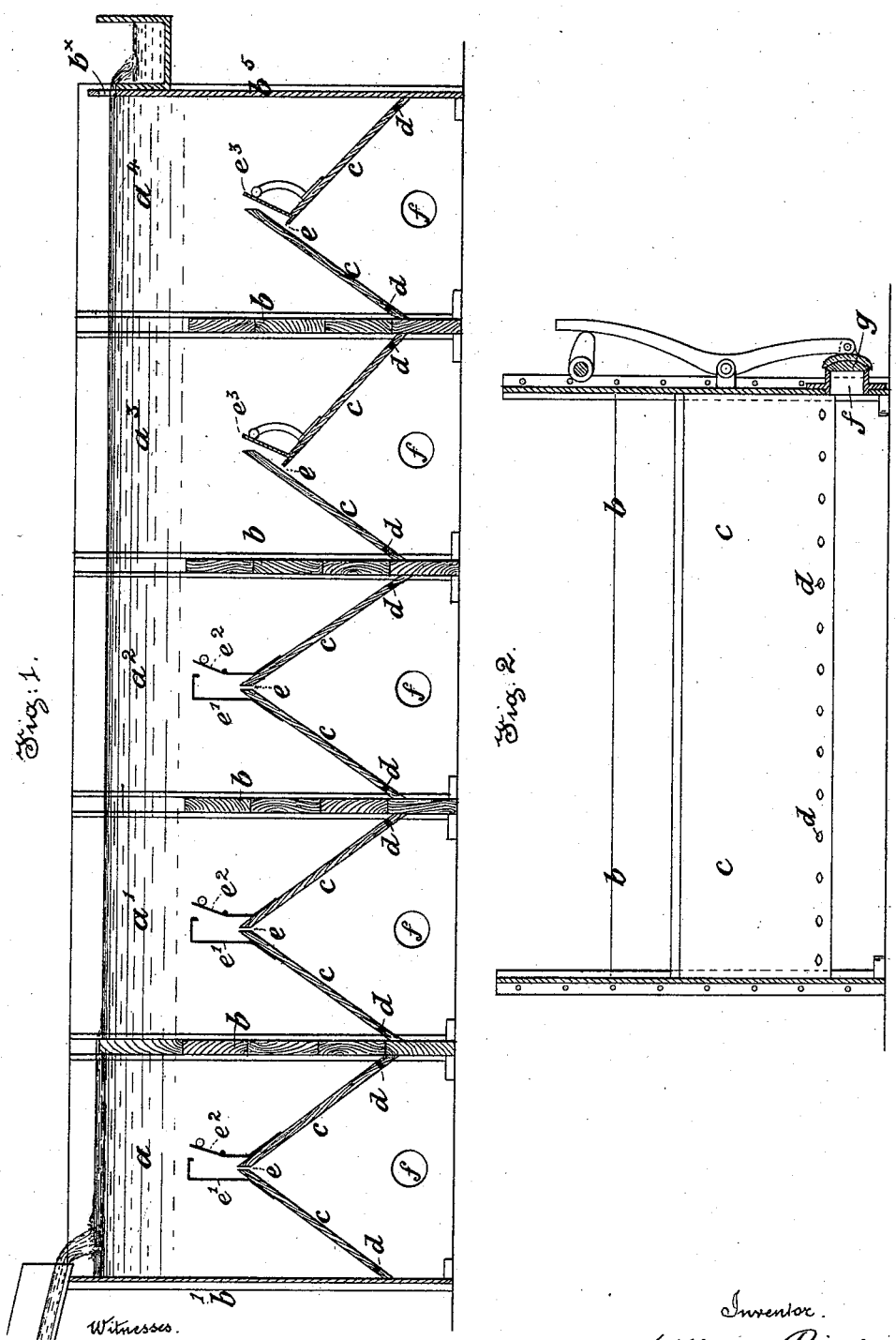
Witnesses.
James Gracie
George Baumann
Inventor.
William Birch
By his Attorneys
Howson and Howson

UNITED STATES PATENT OFFICE.

WILLIAM BIRCH, OF MANCHESTER, ENGLAND.

APPARATUS FOR CLEANSING SEWAGE, &c.

SPECIFICATION forming part of Letters Patent No. 491,796, dated February 14, 1893.

Application filed October 17, 1892. Serial No. 449,154. (No model.)

*To all whom it may concern:*

Be it known that I, WILLIAM BIRCH, a subject of the Queen of Great Britain and Ireland, and residing at Lower Broughton, Manchester, in the county of Lancaster, England, have invented Improved Apparatus Applicable to the Cleansing or Filtration of Sewage and other Liquids, of which the following is a specification.

This invention relates to the construction of apparatus for separating from sewage or other liquids such solid matters as are capable of direct precipitation, and it may be used either by itself for partially cleansing the liquid, or in connection with any known filtering apparatus for subsequently removing floating or other light matters which will not readily precipitate, the object being to remove from the sewage or other liquid all heavy precipitable matter before it passes into or onto the filtering apparatus so as to prevent the filtering medium employed from becoming rapidly "silted up" by the heavy precipitable matter, and thus obviate the necessity for so frequently cleansing and removing the filtering medium.

The nature of my invention and the manner in which it is to be performed and carried into practical effect will be readily understood on reference to the sheet of drawings hereunto annexed and the following explanation thereof.

Figure 1 on the drawings is a vertical longitudinal section through my improved apparatus, and Fig. 2 is a transverse section of the same.

For the purposes of my invention I arrange a series of tanks on the same level or I construct a long open sluice divided into several compartments or tanks $a$, $a'$, $a^2$ by transverse walls or partitions $b$ of which the top edge is below the sides and front end $b'$ of the sluice, so that the sewage or other liquid to be cleansed being pumped or otherwise poured into the first compartment or tank $a$ will fill it to the level of the wall or partition $b$ and then run over the latter into the second compartment or tank $a'$ and so on until all the compartments or tanks are full. It will then run in a level stream over the top of all the transverse partitions and finally escape through perforations $b^x$ near the top of the last or end one $b^5$ which is of about the same height as the sides of the tank.

By preference I make the first wall or partition higher than the others as shown at Fig. 1 as there is more agitation in the first tank than in the others and the great body of the sewage or fluid in these tanks being comparatively stagnant and only the supernatant water above the partitions being in motion the heavy precipitable matter or sludge will be left or deposited in the tanks, while the lighter and partially cleansed fluid (with only floating impurities) will pass over the top of the partitions gradually depositing its heavier precipitable particles as it flows on.

The number of tanks required will depend upon the speed at which the precipitation takes place and this in turn will be dependent upon the treatment (chemical, electrical or otherwise) to which the sewage or other fluid may have been submitted to separate the organic and other matters in a solid form and accelerate their precipitation. If no previous treatment of this kind has been employed the precipitation will be much more gradual and a considerably longer sluice will be required.

Each compartment or tank $a$, $a'$, $a^2$ &c. is provided with a false bottom $c$ fixed to the sides of the sluice and suitably supported at a convenient distance from the bottom of the sluice, and provided at or near its lower edges with a series of small openings $d$ see Fig. 2. The false bottom $c$ is made with two flat surfaces inclined toward each other at the center (as shown) with a narrow opening $e$ at the apex, and in the space beneath this false bottom is a flushing opening $f$ through the side of the sluice provided with a stop tap or valve $g$; and the area of this sludge exit or flushing opening $f$ is greater than the total combined area of the openings $d$ in the inclined false bottom $c$ of its respective compartment. As the precipitate falls down it gravitates toward the sides and passes through the openings $d$ into the space below the false bottom $c$, the clearer water or liquid being thereby forced upward out of this space through the narrow opening $e$. By opening the sludge cocks or valves $g$ when required the precipitated sludge will be forced out by the superincumbent weight of the water above and as the total area of the openings $d$ in each compartment is less than that of the opening $f$ the sludge will be flushed or cleared from every part of the compartment; as soon as clearer water begins to flow the sludge cocks may be closed.

To prevent the escape of clear water through the narrow openings $e$ I provide the latter with a cover $e'$ and an automatically closing flap $e^2$ (as shown in the divisions $a$, $a'$ $a^2$) or with an automatically closing flap $e^3$ (as shown in the divisions $a^3$, $a^4$) so that the clear water can flow upward, but if, when the sludge cocks or valves $g$ are opened the clear water attempts to descend and escape, the downward pressure will close the openings $e$ and the only way of escape for the sludge will be by the openings $d$.

I claim as my invention:—

A series of settling tanks or compartments in juxtaposition on the same level, the partition walls being lower than the sides, each tank or compartment being provided with a false bottom, a sludge escape cock or valve below the false bottom, the latter being formed of two planes inclined upwardly toward one another and having an opening at their apex, the said opening being provided with an automatically closing flap and the said planes being provided at or near their lower edges with small holes, the total area of which is less than the area of the sludge escape cock or valve.

In testimony whereof I have signed my name to this specification in the presence of two subscribing witnesses.

WILLIAM BIRCH.

Witnesses:
GEORGE DAVIES,
JNO. HUGHES.